United States Patent
Shintoku

(10) Patent No.: US 6,657,626 B1
(45) Date of Patent: Dec. 2, 2003

(54) FONT CONTROLLING METHOD AND APPARATUS

(75) Inventor: Akie Shintoku, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/518,807

(22) Filed: Mar. 3, 2000

(30) Foreign Application Priority Data

Mar. 3, 1999 (JP) .......................................... P11-056109

(51) Int. Cl.$^7$ ................................................. G09G 5/24
(52) U.S. Cl. ..................... 345/467; 345/469.1; 345/471; 345/472.1; 345/472.2
(58) Field of Search ................................. 345/467, 685, 345/468, 469, 469.1, 470, 471, 472, 472.1, 472.2, 472.3, 170, 171; 707/536, 518, 517, 519, 520, 521, 530; 348/569, 589, 511; 382/239, 185, 182, 183, 184; 704/3, 8

(56) References Cited

U.S. PATENT DOCUMENTS

| | | | | |
|---|---|---|---|---|
| 5,001,697 A | * | 3/1991 | Torres | 707/542 |
| 5,167,016 A | * | 11/1992 | Bagley et al. | 707/531 |
| 5,416,898 A | * | 5/1995 | Opstad et al. | 345/468 |
| 5,495,577 A | * | 2/1996 | Davis et al. | 707/542 |
| 5,500,931 A | * | 3/1996 | Sonnenschein | 707/529 |
| 5,533,174 A | * | 7/1996 | Flowers, Jr. et al. | 358/1.15 |
| 5,535,119 A | * | 7/1996 | Ito et al. | 704/3 |
| 5,579,057 A | | 11/1996 | Banker et al. | 348/589 |
| 5,623,316 A | * | 4/1997 | Naito et al. | 348/569 |
| 5,675,818 A | * | 10/1997 | Kennedy | 704/8 |
| 6,073,147 A | * | 6/2000 | Chan et al. | 707/542 |
| 6,081,623 A | * | 6/2000 | Bloomfield et al. | 382/239 |

FOREIGN PATENT DOCUMENTS

| | | | | |
|---|---|---|---|---|
| GB | 2324011 | | 10/1998 | G06F/3/153 |
| WO | 9619077 | | 6/1996 | H04N/7/025 |

* cited by examiner

*Primary Examiner*—Matthew Luu
*Assistant Examiner*—Thu-Thao Hawan
(74) *Attorney, Agent, or Firm*—Jay H. Maioli

(57) ABSTRACT

A font controlling method and apparatus in a so-called on-screen display (OSD), in which, when displaying letters or the like of different languages, well-balanced high-quality display that is easy and comfortable to see is enabled without abbreviating a word or splitting one line into two lines. To this end, the font controlling apparatus includes an input signal discriminating unit 2, an OSD control micro-computer 3 and a character generator IC 5. The input signal discriminating unit 2 discriminates the sort of graphics display standard of an input signal. OSD control micro-computer 3 determines the sort of the font in use and size of the font based on a display language request signal from the user and the sort of graphics display standard of the input signal. The character generator IC 5 generates an OSD display signal responsive to the sort of the font determined by OSD control micro-computer 3 and the font size.

8 Claims, 8 Drawing Sheets

1~28 (CHARACTER)

1~16 (ROWS)

```
         INPUT-A
SET SETTING
  STATS:ON
  INPUT-A:RGB
  INPUT-B:RGB
  LANGUAGE:ENGLISH
  INSTALLATION: FRONT CEILING
  SPEAKER:ON
  POWER SAVING:ON
  SIRCS RECEIVER:FRONT&REAR
```

FIG.4B

1~28 (CHARACTER)

1~16 (ROWS)

入力-A
初期設定
　画面表示:オン
　入力A:RGB
　入力B:R▲B
　表示言語:日本語
　設置状態:▼置フロント
　スピーカー:オン
　節電モード:オフ
　SIRCS受光部:前&後

FIG.4C

1~28 (CHARACTER)

1~16 (ROWS)

入力-A
初期設定
　画面表示:オン
　入力A:RGB
　入力B:R▲B
　表示言語:日本語
　設置状態:▼置フロント
　スピーカー:オン
　節電モード:オフ
　SIRCS受光部:前&後

FIG.6A

|     | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| 4 | | | | | | | | | | | | | | | | | | | | | | I | N | P | U | T | - | A |
| 5 | ▨ | I | N | P | U | T | | S | E | T | T | I | N | G | | | | | | | | | | | | | | |
| 6 | ▨ | □ | D | O | T | | P | H | A | S | E | : | 1 | 2 | 3 | | | | | | | | | | | | | |
| 7 | ▨ | □ | S | I | Z | E | | | H | : | 1 | 2 | 3 | 4 | | | | | | | | | | | | | | |
| 8 | ▨ | □ | S | H | I | F | T | | H | : | 1 | 2 | 3 | 4 | | V | : | 1 | 2 | 3 | 4 | | | | | | | |
| 9 | ▨ | □ | S | C | A | N | | C | O | N | V | : | O | N | | | | | | | | | | | | | | |
| 11 | | | | | | | | | | | | | | | | | | | | | | N | o | . | 0 | 6 | | |
| 12 | | | | | | | | | | | | | | | | | | | | | | 6 | 4 | 0 | × | 4 | 0 | 0 |

Same content as FIG.6A with GE label at upper right.

FONT CONTROLLING METHOD AND APPARATUS

BACKGROUND OF THE INVENTION

1. Field of the Invention

This invention relates to a font controlling method and apparatus in, for example, a so-called on-screen display (OSD).

2. Description of the Prior Art

Up to now, for displaying letters etc on a screen surface, the fonts of the same size are used in letters of all languages, such as, for example, English, French, German, Italian, Spanish, Japanese or Chinese, to make display of the OSD.

However, the number of display letters or the number of dots required for display (number of pixels) differ appreciably from one language to another. Specifically, in languages employing alphabetical letters, the number of letters of a word is larger, whereas, in languages employing kanji letters, the number of strokes that make up a kanji letter is larger, even though the number of letters is small.

Thus, in OSD display of letter strings of respective languages, the following problems arise.

(1) If, for example, it is desired to display a sentence made up of plural words in a given picture display range where there is imposed a limitation on the number of letters displayed, there are occasions wherein, in the course of spelling the last word in a given line, the limitation on the number of letters that can be displayed in the above-mentioned picture display range, that is, the limitations on the number of letters for one line is exceeded. In such case, the conventional practice is to use an abbreviated spelling of a word in the line or to divide the line into two lines for display. However, if the spelling corresponding to the abbreviation of the word in question is used, such spell means a word inexplicit in meaning for a user who is not aware of what word is denoted by the abbreviated spelling. On the other hand, if the line is split in two lines, the resulting display tends to be extremely unintelligible to the user.

(2) There are also occasions wherein, depending on the specific language displayed, the display balance on the entire screen is not optimum for OSD display. For example, if a sentence is represented in English, the sentence can be represented on the entire screen , whereas, if the same sentence is represented in Japanese, it is partially displayed on a portion of the screen, thus worsening the display balance. On the other hand, in a language employing kanji letters, such as Japanese or Chinese, a large number of dots (pixels) are required for demonstrating the kanji letters with a large number of strokes.

(3) If, for example, a string of letters made up of plural letters and words, is to be displayed on a picture display range consisting of a pre-set number of pixels, and the number of letters for one line is large, it may be an occurrence that portions of the string of the letters are not comprised within the picture display range. That is, there are a variety of graphics display standards, such as so-called Extended Graphics Array (XGA), Video Graphics Array (VGA) or Super VGA (SVGA) in the display standards, such that, if the string of the letters is comprised within a single line in a certain display standard, it cannot be comprised within one line of the picture range in another display standard. The conventional practice for this case is to use the abbreviated spelling for the word in the string of letters, or to split the line into two lines. However, in such case, as in (1) above, the abbreviated spelling for the word in question means an inexplicit word for a user not aware of what word is actually meant by the abbreviated spelling, whereas, if a line is split into two lines, the result is a display difficult to understand for the user.

SUMMARY OF THE INVENTION

It is therefore an object of the present invention to provide a font controlling method and apparatus in which, if letters etc of various different languages are displayed in OSD, well-balanced, easy-to-see and high-quality display may be assured without abbreviating the word or splitting a line into two two lines.

In order to solve the above problem, the font controlling method of the present invention finds the sort of the character to be displayed and the type of an input signal, determines the sort and the size of the font to be used based on the sort of the character and generates the input signal and the character display signal responsive to the sort and the size of the font.

Also, in order to solve the above problem, the font controlling apparatus of the present invention includes means for verifying the sort of the character to be displayed, means for verifying the sort of the input signal, means for determining the sort and the size of the font in use, based on the sort of the character and the input signal and means for generating the character display signal responsive to the sort and the size of the font.

In the font controlling method and apparatus according to the present invention, the type and the size of the font in use are determined based on the sort of the character to be displayed and on the input signal and the character display signal is generated responsive to the sort and the size of the font to enable display which is easy and comfortable to view, well-balanced and is of high quality without abbreviating a word or splitting a line into two lines.

BRIEF DESCRIPTION OF THE DRAWINGS

FIG. 2 illustrates a display example in which limitations on the number of letters or characters displayable in the picture display range is exceeded, and an example in which a letter font set is used to have the string of letters comprised in the picture display range.

FIG. 4 illustrates an example in which the display balance in the picture display range is worsened with the displayed language and an example of adjusting the display balance by changing the font size.

FIG. 6 illustrates an example in which the OSD display is not comprised in the picture display range depending on the sort of the input signal and an example in which the OSD display is comprised within the picture display range by changing the font size.

DESCRIPTION OF THE PREFERRED EMBODIMENTS

Figure 1:
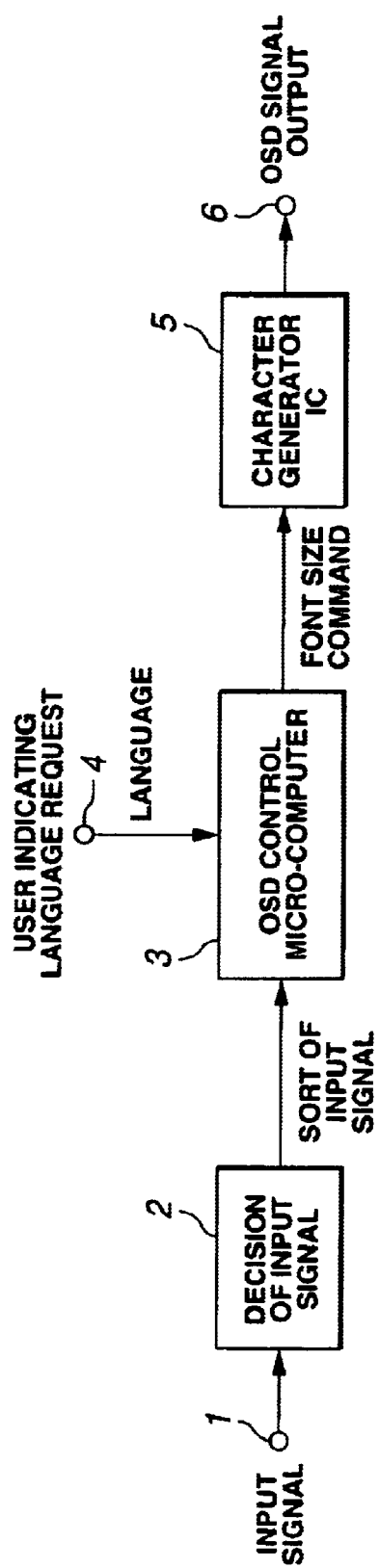
FIG. 1 is a block circuit diagram a schematic structure of an OSD signal generating apparatus for implementing the a font controlling method and apparatus according to the present invention.

Referring to the drawings, preferred embodiments of according to the present invention will be explained in detail.

FIG. 1 shows a schematic structure of an OSD signal generating apparatus for implementing the font controlling method and apparatus embodying the present invention.

In FIG. 1, signals of a variety of graphics display standards, such as XGA, VGA or SVGA, are routed to a terminal 1 as input signals. To a terminal 4 are inputted display request signals, which a user requests as characters to be displayed. The characters herein mean not only letters, symbols, numerical figures or special control letters, but also so-called icons. Since the following description of the present embodiment is made taking mainly languages, such as, English, French, German, Italian, Spanish, Japanese or Chinese, into account, the display request signals, supplied to the terminal 4, are referred to below as display language request signals. The input signals from the terminal 1 are routed to an input signal discriminating unit 2, whilst the display language request signals from the terminal 4 are sent to an OSD control micro-computer 3.

The input signal discriminating unit 2 discriminates the types of the graphics display standard of the input signal. The input signal type information, obtained on this discrimination, is outputted from the input signal discriminating unit 2, along with the input signal, so as to be routed to the OSD control micro-computer 3.

The OSD control micro-computer 3 determines the types of the letters or icons to be displayed by OSD, and the size of the font (font size), based on the input signal and the information on the input signal sort from the input signal discriminating unit 2 and on the display language request signals from the user, sent from the terminal 4, and routes the font type and the font size information to a character generator IC 5.

The character generator IC 5 generates signals for screen display (OSD signals), based on the font type and the font size information sent from the OSD control micro-computer 3, to route the font type and the font size information to a picture display unit, not shown in FIG. 1, via terminal 6.

Figures 2A, 2B:
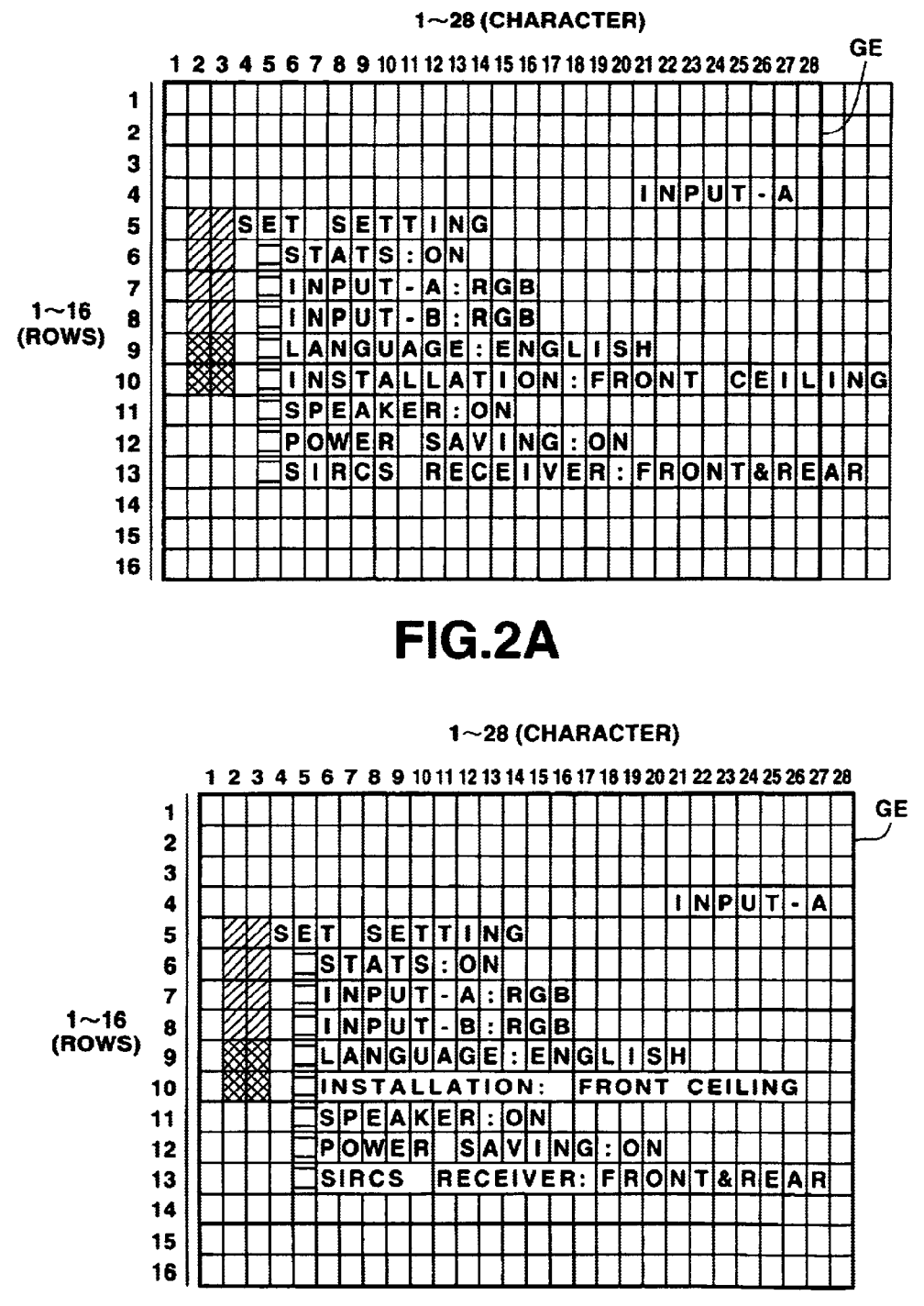
Figure 3:
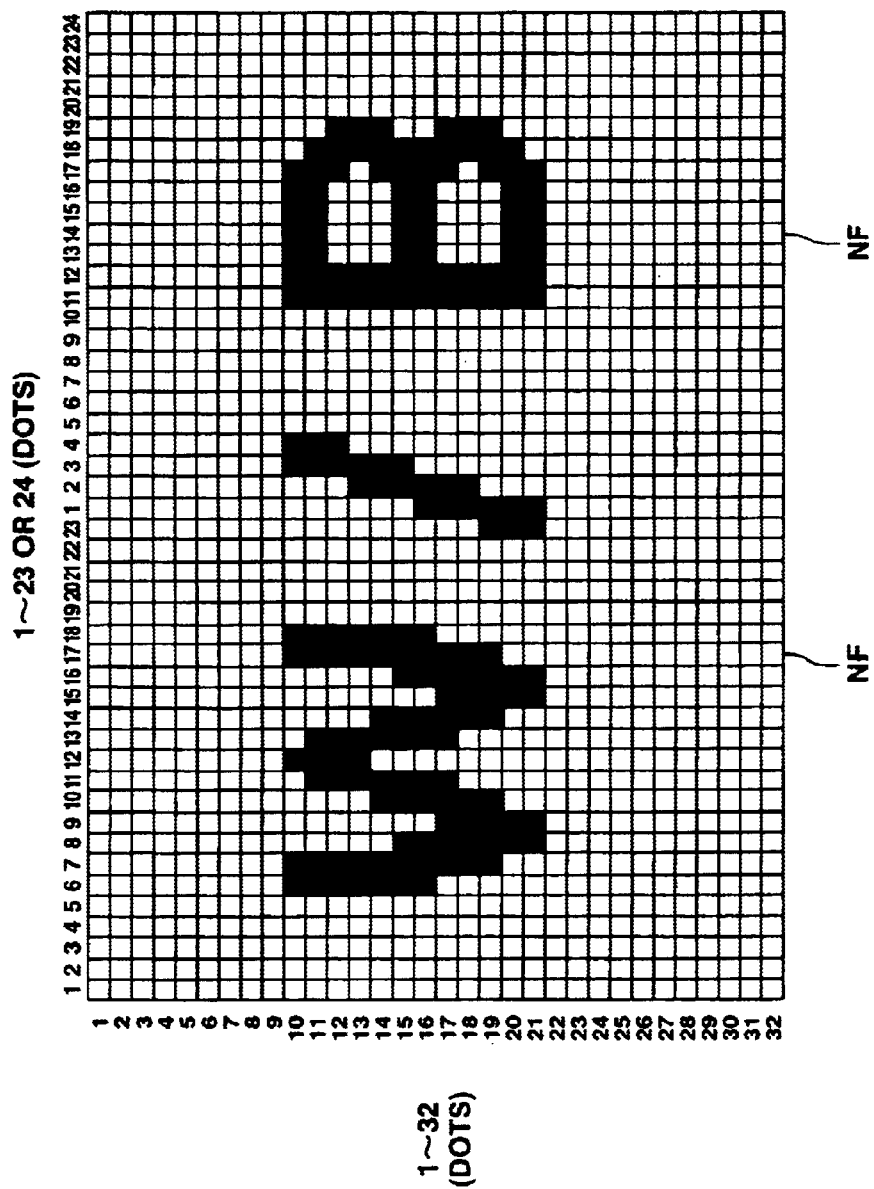
FIG. 3 illustrates a letter font set.

In the present embodiment, if, when it is desired to display e.g., a sentence, made up of plural words, in a picture display range GE of an OSD where there is placed a limitation on the number of displayed letters, a certain string of letters to be displayed in a certain line is not comprised within the picture display range GE, or the number of display letters exceeds the maximum number of letters displayable in the picture display range GE, specifically, the limitation on the number of letters displayable in the picture display range GE, that is the limitation on the number of letters displayable in one line, is exceeded in the course of spelling the last word for one line, as shown in FIG. 2a, a letter font set, shown in FIG. 3, is used to have the letter string comprised within the limitation on the number of letters for one line in the picture display range GE, as shown in FIG. 2b.

Specifically, FIG. 2 shows an example in which a range of 28 letters in the transverse direction and 16 letters in the vertical direction (lines) corresponds to the picture display range GE. In the example shown in FIG. 2a, the letter strings of the tenth and thirteenth lines exceed the limitations on the number of the displayable letters in one line of the picture display range GE (28 letters). Specifically, the last word "CEILING" of the tenth letter string and last word "REAR" of the thirteenth letter string, as these words are being spelled, trespass the picture display range GE.

Thus, in the present embodiment, the letter set font, shown in FIG. 3, is used only for the tenth and thirteenth letter strings of FIG. 2a, in order that these tenth and thirteenth letter strings will be comprised within the limitations for the number of letters (28 letters) for the picture display range GE, as shown in FIG. 2b. Specifically, in the example of FIG. 2b, letter set fonts are used for "INSTALLATION:" and for "FRONT CEILING" in the letter string of the tenth line and for "SIRCS" and for "RECEIVER" in the letter string of the sixteenth line.

The letter set font for realizing the above means a letter in which not less than one letter is assembled into a range NF of, for example, 23 by 23 dots if, in an ordinary letter, one letter is assembled into the range of 23 by 23 dots NF. FIG. 3 shows an example in which three letters "W", "/" and "B" are assembled into ranges NF, NF in which two letters are normally assembled. It is noted that the example of FIG. 3 is merely illustrative and two or more letters may be assembled into the range NF for one letter insofar as this does not render the letter difficult to view. A variety of letter set fonts may be used, such as those in which four or more letters are assembled into ranges NF, NF, NF normally destined for three letters.

Figure 5A:
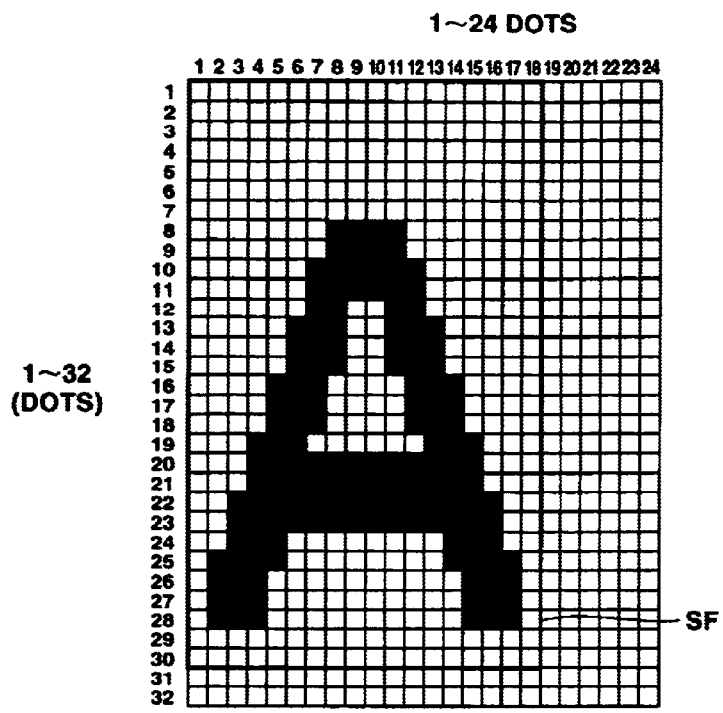
FIG. 5 illustrates an example of a small size font and a large size font, used depending on the displayed language.
Figure 5B:
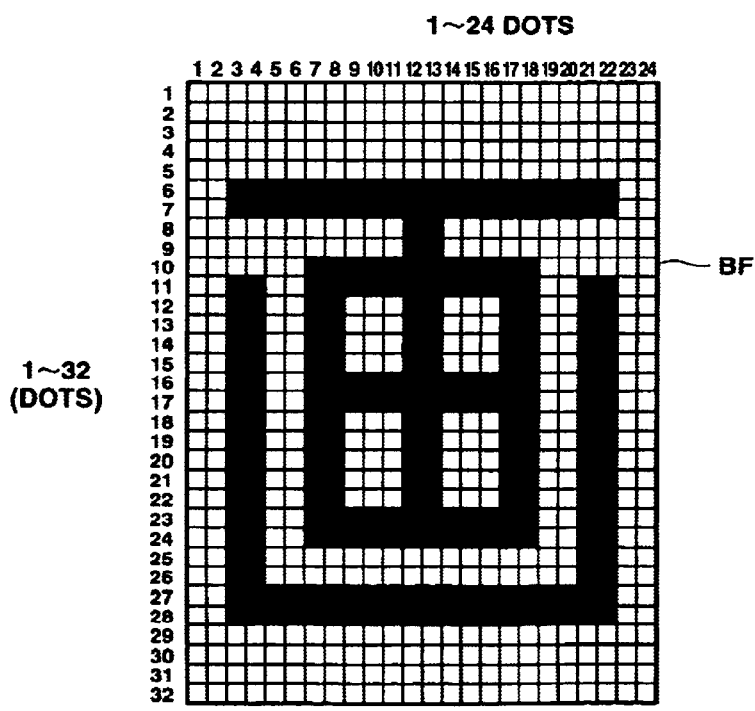

In the present embodiment, as described above, if, when a sentence made up of plural words is to be displayed in a picture display range where there is a limitation on the number of display letters, a letter string of a certain line exceeds the limitation on the number of letters displayable in the picture display range, that is the limitation on the number of displayable letters, the letter set font is used for the letter string of the overflowing line to enable the letter string of the line to be comprised within the limitation on the number of letters for one line in the picture display range. That is, in the above-described prior-art example, an abbreviated spelling is used for a word, or a line is split into two lines, as a result of which the displayed word becomes unintelligible to the user or the display is difficult to decipher for the user. In the present embodiment, abbreviated spelling or splitting of an overflowing line into two lines may be evaded to realize display which is easy and comfortable to view and moreover is of high quality.

in another embodiment of the present invention, if, in displaying a certain sentence in a picture display range GE, a sentence is to be displayed in English, as shown in FIG. 4a, a letter of a small font size, shown in FIG. 5a, is used to enable the English representation to be displayed in a well-balanced manner on the entire area of the picture display range GE. On the other hand, if the sentence is to be displayed in Japanese, a larger font size is used, as shown in FIG. 5b, in order to evade unbalanced display in which the letter is displayed at an offset position in the picture display range GE, as shown in FIG. 5b. This realizes well-balanced arraying of the sentence in Japanese representation in the picture display range GE, as shown in FIG. 4c.

Specifically, FIGS. 4a and 4b show examples in which a range of 28 letters in the transverse direction and 16 letters in the vertical direction (lines) is within the picture display range GE. In the example shown in FIG. 4a, letters etc of a small font size, shown in FIG. 5a, are used to array the letters in English representation in a well-balanced manner on the entire area of the picture display range GE, whereas, in the example of FIG. 4b, the letters in Japanese representation are of the same font size as that used in FIG. 5a, with the result that the letters in Japanese representation, in which the number of letters for given contents is smaller than in corresponding English representation, are offset in an area of the picture display range GE, while the kanji letters, having a larger number of strokes, become collapsed and hence are more difficult to read.

Thus, in the present embodiment, a smaller font size shown in FIG. 5a is used for English representation to enable the English representation to be arranged in a well-balance manner in an entire area of the picture display range GE, whilst a larger font size is used for Japanese representation, and the display position thereof is adjusted so that the font will be displayed centrally of the area of the picture display range GE, whereby the letters in Japanese representation are arrayed in a well-balanced and easy-to-see fashion in the picture display range GE, as shown in FIG. 4c.

Meanwhile, in the present embodiment, the picture display range GE in case the display is made with a larger font size is a range of 23 letters in the transverse direction and 16 letters in the vertical direction (line), as shown in FIG. 4c. Also, in the present embodiment, a letter is constituted in a range SF of 18 dots by 30 dots for a small size font shown in FIG. 5a, whilst a letter is constituted in a range BF of 24 dots by 32 dots for a larger size dot shown in FIG. 5b. This, however, is merely illustrative and a smaller or larger size font may be used insofar as the letters are not rendered inferior in viewing properties. Also, in the example of FIG. 4, letters of Japanese are taken as an example as letters employing a larger size font. However, such font of the larger size is to be used in case Chinese letters or special icons are to be displayed.

In the preferred embodiment of the present invention, as described above, if, when a certain letter is displayed in OSD, the display on the entire area of the display range is not well-balanced, depending on the language, the size font in meeting with the language is used, and the display position is also adjusted to enable well-balanced easy-to-see display.

Figure 7A:
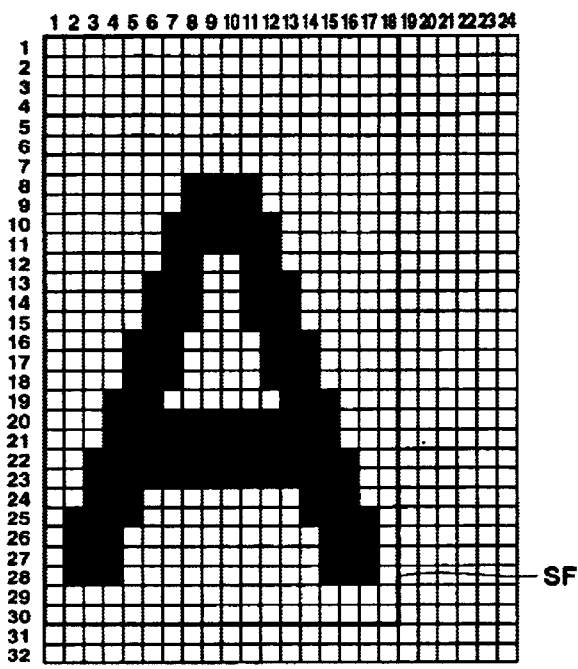
FIG. 7 illustrates an example of a small size font and a large size font, used depending on the input signal.

Also, in a preferred embodiment, if, when a letter string comprised of plural letters or words is to be displayed in the picture display range GE, made up of a pre-set number of pixels in accordance with a pre-set graphics display standard, as shown in FIG. 6a, input signals constructed in accordance with a graphics display standard, which is different from the above-mentioned pre-set graphics display standard, and in which the number of letters per line is larger than that provided in the above-mentioned preset graphics display standard, are furnished, such that a portion of the letter string cannot be accommodated in the picture display range GE, letters of the small size font shown in FIG. 7a are used to enable the entire letter string to be comprised within the picture display range GE, as shown in FIG. 6b.

That is, there is shown in FIG. 6a an example in which a range of 23 letters in the transverse direction and 16 letters in the vertical direction corresponds to the picture display range GE. However, in the example of FIG. 6a, it is attempted to display a letter string of a large font size of FIG. 7b by the input signals of a different graphics display standard, so that the letter strings of fourth, eighth, eleventh and twelfth lines cannot be comprised in one line in the picture display range GE (23 letters). In the example of FIG. 6a, a letter string "INPUT-A" of the fourth line, a letter strong of "1234" of the eighth line, a letter string "NO.6" of the eleventh line and a letter string "640×640" of the twelfth line are not comprised in one lines. More specific graphics display standards are taken by way of an illustration. Supposing that there are plural resolutions of the input signals, as in a so-called multi-scan display, input signals can be displayed by OSD in the picture display range GE conforming to e.g., the XGA standard, however, the input signals occasionally cannot be displayed in the picture display range GE conforming to the so-called VGA standard because the number of pixels of the picture display range GE in this case is smaller. That is, depending on the graphics display standard of the input signals, it may be an occurrence that the display letter string exceed the picture display range GE of the VGA standard in question.

Thus, in the preferred embodiment, if input signals of a different graphics display standard, not comprised in the picture display range GE, as shown in FIG. 6a, a letter of a small font size, as shown in FIG. 7a, is used, so that the letter string in its entirety will be comprised in the picture display range GE, as shown in FIG. 6b. More specifically, if the graphics display standard is the XGA standard, the font displayed in the picture display range GE is of a large size. If the graphics display standard is the SVGA, the font displayed in the picture display range GE conforming to the SVGA standard is of a medium size, whereas, if the graphics display standard is the VGA, the font displayed in the picture display range GE conforming to the VGA standard is of a small size.

Figure 7B:
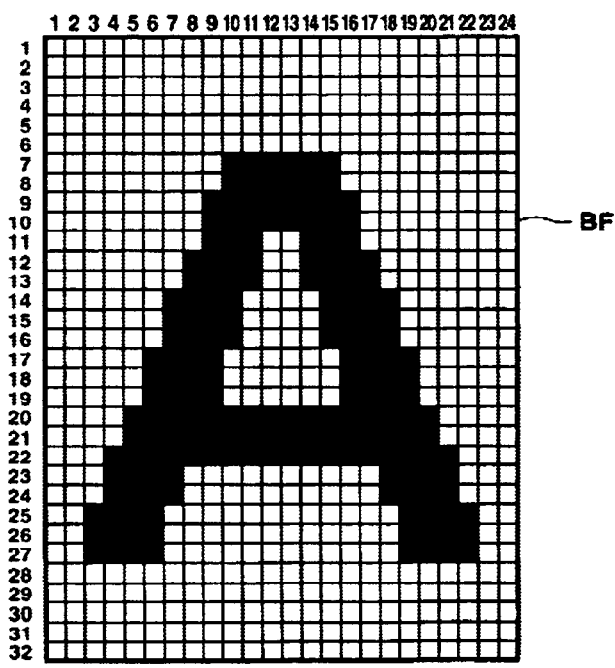

In the preferred embodiment, a range of 23 letters in the transverse direction and 16 letters in the vertical direction (lines), as shown in FIG. 6a, is taken as an example of the picture display range GE of the graphics display standard with a smaller number of pixels, whilst a range of 28 letters in the transverse direction and 16 letters in the vertical direction (lines), as shown in FIG. 6b, is taken as an example of the picture display range GE of the graphics display standard with a larger number of pixels. Also, in the preferred embodiment, such a font size which enables a letter to be constituted in a range BF of 24 dots by 32 dots as shown in FIG. 7b is taken as an example of the font size used in the picture display range GE of the graphics display standard with a larger number of pixels. On the other hand, such a font size which enables a letter to be constituted in a range SF of 18 dots by 32 dots as shown in FIG. 7a is taken as an example of the font size used in the picture display range GE of the graphics display standard with a smaller number of pixels. The above applies for graphics display standards other than the above-mentioned XGA or VGA as well.

In the preferred embodiment, as described above, in which the font size is optimized depending on the graphics display standard, the entire letter string can be comprised in the picture display range without regard to the graphics display standard of the input signal. Specifically, with the prior-art example, described previously, abbreviated words are used, or an overflowing line is split into two lines, as a result of which the word becomes unintelligible to a user, or difficult to decipher for the user. According to the preferred embodiment, high-grade display and comfortable to view can be realized without the necessity of employing abbreviated spelling or splitting a line into two lines.

Figure 8:
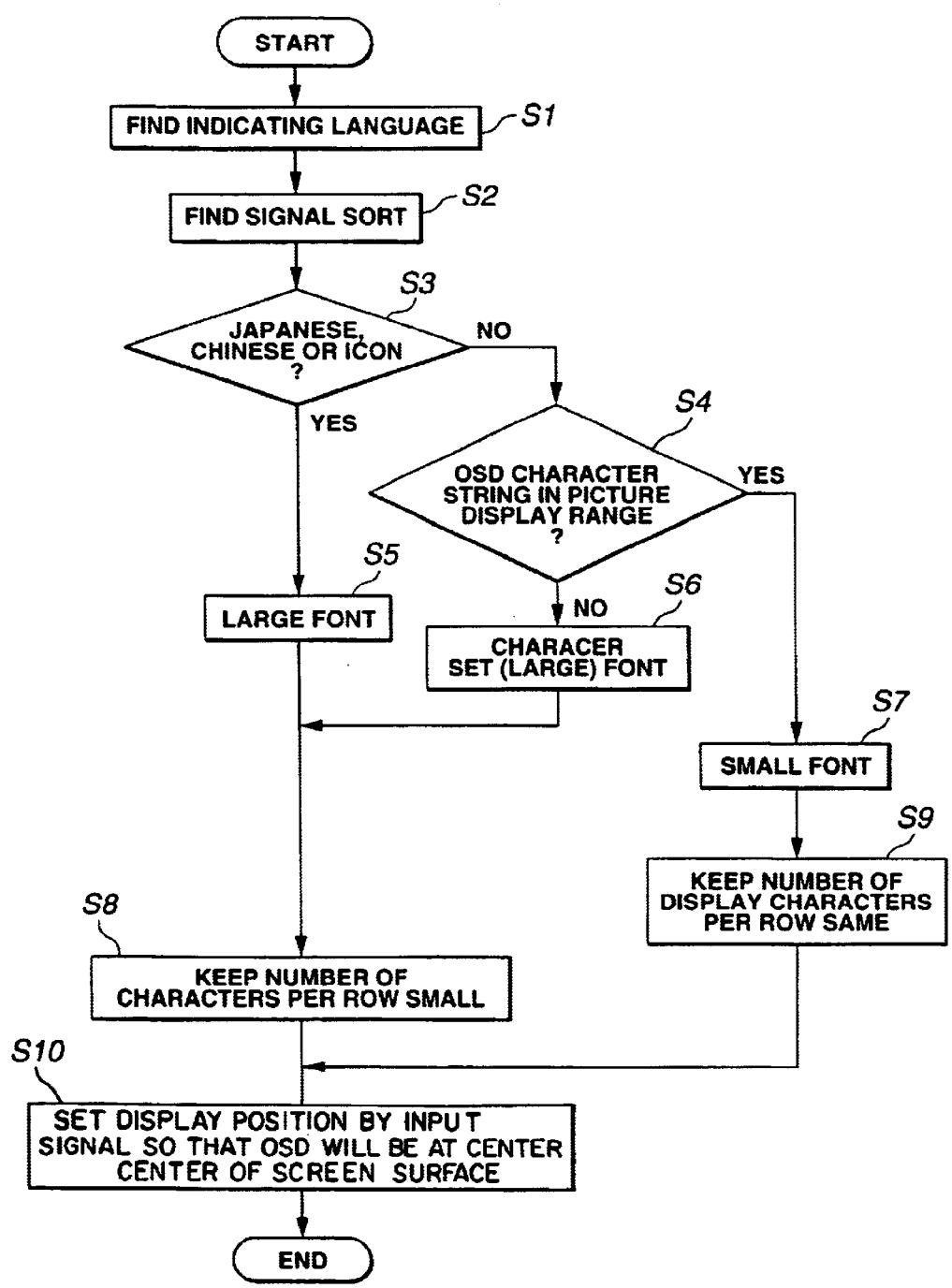
FIG. 8 is a flowchart for illustrating the processing flow for determining the font by an OSD controlling microcomputer.

FIG. 8 shows a schematic flow of font decision processing which is dependent on the sort of the input signal and the display language request in the OSD control micro-computer 3 configured as shown in FIG. 1. Meanwhile, the processing of FIG. 8 is the processing performed by the OSD control micro-computer 3.

Referring to FIG. 8, the OSD control micro-computer 3 first finds at step 1 the sort of the display language requested by the user. Specifically, plural selection menus, associated with plural languages, are displayed on a display screen, in order to find the type of the display language requested by the user, depending on which of the plural selection menus the user has selected.

The OSD control micro-computer 3 then finds at step S2 the sort of the input signal. Specifically, the OSD control micro-computer 3 finds, based on the input signal sort information, derived from the input signal discriminating unit 2 of FIG. 1, to which graphics display standard belongs the input signal supplied to the terminal 1.

The OSD control micro-computer 3 then verifies at step S3 whether or not the sort of the display language requested by the user is the so-called icon instead of Japanese, Chinese or letters. That is, the OSD control micro-computer 3 verifies whether or not the user is requesting the display of a font which is difficult to view unless it is displayed to a fairly large size, as in the case of Japanese or Chinese employing kanji characters, or in the case of special icons. If the OSD control micro-computer 3 has verified at step S3 that the user is requesting the display of Japanese, Chinese or special icons (YES), the OSD control micro-computer 3 advances to the processing of step S5 and, if otherwise (NO), the OSD control micro-computer 3 advances to the processing of step S4.

If the OSD control micro-computer 3 has verified at step S3 that the user is requesting the display of Japanese, Chinese or special icons (YES), the OSD control micro-computer 3 decides at step S5 that a larger size font be used. After the processing of this step S5, the OSD control micro-computer 3 advances to the processing of step S8.

Conversely, if the OSD control micro-computer 3 has verified at step S3 that the user is requesting the display other than that of Japanese, Chinese or special icons, the OSD control micro-computer 3 decides at step S4 whether or not the letter string to be displayed by OSD is comprised within the picture display range. If the OSD control micro-computer 3 verifies that the letter string is comprised within the picture display range (YES), the OSD control micro-computer 3 advances to processing of step S7 and, if otherwise (NO), the OSD control micro-computer 3 advances to processing of step S6.

If the OSD control micro-computer 3 verifies at step S4 that the letter string etc is comprised within the picture display range, the OSD control micro-computer 3 at step S7 decides employing a small size font. After the processing at step S7, the OSD control micro-computer 3 advances to processing at step S9.

If the OSD control micro-computer 3 verifies at step S4 that the letter string etc is not comprised within the picture display range, the OSD control micro-computer 3 at step S6 decides employing a letter set font. After the processing at step S6, the OSD control micro-computer 3 advances to processing at step S8.

If the OSD control micro-computer 3 advances to the processing at step S8, the OSD control micro-computer 3 reduces the number of letters for one line in the picture display range. After the processing at step S8, the OSD control micro-computer 3 advances to processing at step S10.

If the OSD control micro-computer 3 advances to the processing at step S9, the OSD control micro-computer 3 leaves the number of display letters for one line in the picture display range unchanged. After the processing at step S9, the OSD control micro-computer 3 advances to processing at step S10.

If the OSD control micro-computer 3 advances to the processing at step S10, the OSD control micro-computer 3 sets the display position, by the input signal, so that the OSD display will be at the center of the screen surface.

What is claimed is:

1. A method for controlling a font comprising the steps of:

discriminating a sort of character to be displayed based on a display language request entered by a user;

determining a type and a size of a font to be used, based on the sort of character to be displayed obtained in said step of discriminating such that when the character is displayed, all characters that are intended to be displayed on a single line of a display are displayed on the single line by setting a letter set font which allows more than one character to be displayed in a font space used for one character; and generating a display signal for the character responsive to the sort and the size of said font obtained in said step of determining.

2. The method according to claim 1 further comprising the step of:

determining a use/non-use of a font set comprised of a plurality of the characters based on a number of the characters and a displayable range of the characters to be displayed.

3. The method according to claim 1 wherein said character is a letter of a predetermined language and wherein the size of the font is determined responsive to a relative length or a number of strokes of a word constituted by a plurality of letters of said predetermined language.

4. The method according to claim 3 wherein a display position is adjusted depending on a sort of said predetermined language.

5. A display apparatus comprising:

means for discriminating a sort of character to be displayed based on a display language request entered by a user;

means for determining a type and a size of a font to be used, based on the sort of character to be displayed from said means for discriminating such that when the character is displayed, all characters that are intended to be displayed on a single line of a display are displayed on the single line by setting a letter set font which allows more than one character to be displayed in a font space used for one character; and means for generating a display signal for the character responsive to the sort of said font from said means for determining.

6. The display apparatus according to claim 5 further comprising:

means for verifying a use/non-use of a font set comprised of a plurality of characters based on number and displayable range of the characters to be displayed.

7. The display apparatus according to claim 5 wherein said character is a letter of a predetermined language and wherein said determining means determines the size of the font responsive to a relative length or a number of strokes of a word constituted by said letters.

8. The display apparatus according to claim 7 wherein said determining means includes means for adjusting a display position depending on a sort of said predetermined language.

* * * * *